US008515240B2

(12) United States Patent
Paillard

(10) Patent No.: US 8,515,240 B2
(45) Date of Patent: Aug. 20, 2013

(54) TRANSPORTING VIBRO-KINETIC SIGNALS IN A DIGITAL CINEMA ENVIRONMENT

(75) Inventor: Bruno Paillard, Sherbrooke (CA)

(73) Assignee: D-Box Technologies Inc., Longueuil, QC (CA)

( * ) Notice: Subject to any disclaimer, the term of this patent is extended or adjusted under 35 U.S.C. 154(b) by 335 days.

(21) Appl. No.: 12/865,000

(22) PCT Filed: Feb. 19, 2009

(86) PCT No.: PCT/CA2009/000202
§ 371 (c)(1),
(2), (4) Date: Jul. 28, 2010

(87) PCT Pub. No.: WO2009/103162
PCT Pub. Date: Aug. 27, 2009

(65) Prior Publication Data
US 2010/0332004 A1    Dec. 30, 2010

Related U.S. Application Data

(60) Provisional application No. 61/030,053, filed on Feb. 20, 2008.

(51) Int. Cl.
*H04N 9/80* (2006.01)
(52) U.S. Cl.
USPC ........................ 386/239; 700/94; 348/407.1
(58) Field of Classification Search
USPC ...................... 386/239; 700/94; 348/407.1
See application file for complete search history.

(56) References Cited

U.S. PATENT DOCUMENTS 5,486,141 A * 1/1996 Ohga et al. ................... 472/60
6,539,356 B1 3/2003 Matsui et al.
(Continued)

FOREIGN PATENT DOCUMENTS

JP 10011100 1/1998
JP 11205153 7/1999
(Continued)

OTHER PUBLICATIONS

"Specification of the Digital Audio Interface (The AES/EBU interface)", Jan. 1, 2004, XP55001965, retrieved from the Internet: URL:http://tech.ebu.ch/docs/tech3250.pdf.
EPO—Supplementary European Search Report—EP 09 71 2618—(EPO Form 1503 03.82)—Jul. 5, 2011—8 pages.
Translation of Office Action provided from Japan and dated Feb. 19, 2013 explaining prior art in Japan language.

*Primary Examiner* — Thai Tran
*Assistant Examiner* — Girumsew Wendmagegn
(74) *Attorney, Agent, or Firm* — Benoît & Côté Inc.

(57) ABSTRACT

There is described method for producing a computer file for inclusion in an audio bundle of a digital cinema file in which is encoded a multi-channel vibro-kinetic signal for controlling a motion platform. The audio bundle is for being transported over a digital transport link between a D-Cinema player and a motion decoder. The method comprises: obtaining a succession of blocks of vibro-kinetic samples from a vibro-kinetic file (e.g., a KineLink file); encoding binary data which represents the samples of the multi-channel vibro-kinetic signal into a sequence of monophonic PCM samples, according to a defined structure; and building a computer file using the encoded binary data, the computer file for incorporation into the audio bundle of the digital-cinema file, the encoded binary data for being transported over the digital transport link of the D-Cinema player to a motion decoder controlling the motion platform. A corresponding encoder, a corresponding decoder and a corresponding decoding method are also described.

20 Claims, 6 Drawing Sheets

(56) References Cited

U.S. PATENT DOCUMENTS

| | | |
|---|---|---|
| 7,321,799 B2 | 1/2008 | Paillard |
| 2002/0154773 A1* | 10/2002 | Standard et al. ............... 380/236 |
| 2006/0256972 A1* | 11/2006 | Roy et al. ......................... 381/23 |
| 2007/0123203 A1 | 5/2007 | Kim |

FOREIGN PATENT DOCUMENTS

| | | |
|---|---|---|
| JP | 2003115857 | 4/2003 |
| JP | 2006215125 | 8/2006 |
| JP | 2007074158 | 3/2007 |
| WO | WO 2006/113999 | 11/2006 |

* cited by examiner

TRANSPORTING VIBRO-KINETIC SIGNALS IN A DIGITAL CINEMA ENVIRONMENT

FIELD

The present description deals with digital cinema. More particularly, the description deals with the issues of storage, delivery and synchronization of a vibro-kinetic signal (i.e., motion and vibration) with audio and video signals in the Digital Cinema framework.

BACKGROUND

In controlling motion platforms, there are challenges in the synchronization, storage and delivery of vibro-kinetic signal streams with audio streams and video streams. Solutions exist, but they are not necessarily well adapted for the digital cinema environment.

The present description aims to propose solutions to the aforementioned challenges.

SUMMARY

Figure 1:
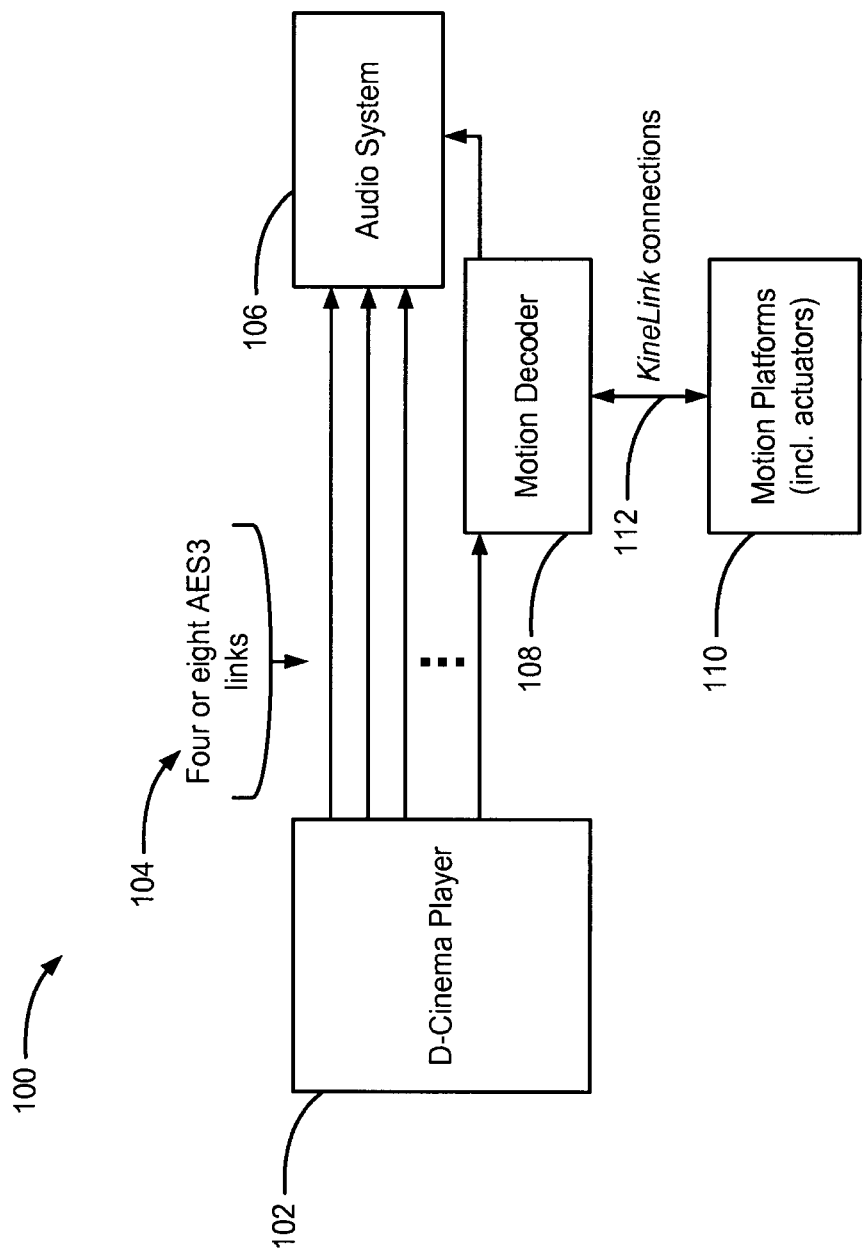
FIG. 1 is a block diagram showing a portion of a Digital Cinema system including a motion decoder according to an embodiment of the invention.

In the target application, the vibro-kinetic signal represents a multi-channel stream of position coordinates, sampled at 400 Hz, with a bandwidth of 0 to 100 Hz. According to an embodiment, the technology described herein allows the storage and playback of this multi-channel signal by a D-Cinema server in synchrony with the audio and video content. KineLink is the name of the specialized protocol used to transport the vibro-kinetic signal from a motion decoder to motion platforms. Motion Code™ or Motion FX represents the content of the multi-channel vibro-kinetic signal that is encoded and delivered to the motion platform.

According to an embodiment, there is provided a method for producing a computer file for inclusion in an audio bundle of a digital cinema file in which is encoded a multi-channel vibro-kinetic signal for controlling a motion platform. The audio bundle is for being transported over a digital transport link between a D-Cinema player and a motion decoder. The method comprises: obtaining a succession of blocks of vibro-kinetic samples from a vibro-kinetic file (e.g., a KineLink file); encoding binary data which represents the samples of the multi-channel vibro-kinetic signal into a sequence of monophonic PCM samples, according to a defined structure; and building a computer file using the encoded binary data, the computer file for incorporation into the audio bundle of the digital-cinema file, the encoded binary data for being transported over the digital transport link of the D-Cinema player to a motion decoder controlling the motion platform.

According to an embodiment, there is provided a motion encoder for producing a computer file for inclusion in an audio bundle of a digital cinema file. The motion decoder comprises an input for receiving a succession of blocks of vibro-kinetic samples from a vibro-kinetic file; a processor for encoding binary data which represents the samples of the multi-channel vibro-kinetic signal into a sequence of monophonic PCM samples, according to a defined structure; and for building a computer file using the encoded binary data, the computer file for incorporation into the audio bundle of the digital-cinema file, the encoded binary data for being transported over the digital transport link of the D-Cinema player to a motion decoder controlling the motion platform; and an output for forwarding the computer file to a memory device.

According to an embodiment, there is provided a method for decoding, in real time, a multi-channel vibro-kinetic signal included in a digital cinema audio stream. The digital cinema audio stream comprising a PCM channel. The vibro-kinetic signal comprising blocks of vibro-kinetic samples and being for controlling a motion platform. The method comprises: monitoring the channel of the digital audio stream; decoding the vibro-kinetic signal from the digital audio stream; and using the vibro-kinetic signal to control the motion platform.

According to an embodiment, there is provided a motion decoder for decoding, in real time, a multi-channel vibro-kinetic signal included in a digital cinema audio stream (AES3). The digital cinema audio stream comprising a PCM channel. The vibro-kinetic signal comprising blocks of vibro-kinetic samples and being for controlling a motion platform. The motion decoder comprises: a receiver for receiving and monitoring the digital audio stream; a processor for decoding the vibro-kinetic signal from the encoded digital audio stream; and an output for outputting the vibro-kinetic signal used to control the motion platform.

According to an embodiment, there is provided a method for decoding, in real time, a multi-channel vibro-kinetic signal included in a digital cinema audio stream (AES3). The digital cinema audio stream comprises two (PCM) channels. The vibro-kinetic signal is for controlling a motion platform. The method comprises: monitoring both channels of the digital audio stream; selecting the channel from the digital audio stream which comprises the encoded vibro-kinetic signal; decoding the vibro-kinetic signal from the digital audio stream; and using the vibro-kinetic signal to control the motion platform.

According to an embodiment, there is provided a motion decoder for decoding, in real time, a multi-channel vibro-kinetic signal included in a digital cinema audio stream (AES3). The digital cinema audio stream comprises two (PCM) channels. The vibro-kinetic signal is for controlling a motion platform. The motion decoder comprises: a receiver for receiving and monitoring the digital audio stream; a processor for selecting the channel from the digital audio stream which comprises the encoded vibro-kinetic signal; and for decoding the vibro-kinetic signal from the encoded digital audio stream; and an output for outputting the vibro-kinetic signal used to control the motion platform.

DETAILED DESCRIPTION

Referring to FIG. 1, a portion of a digital cinema system 100 is shown. The digital cinema system 100 comprises a D-Cinema player 102 (D-Cinema is meant to include E-Cinema as well in this document) connected to an audio system 106 and a motion decoder 108 using 4 AES3 connections 104. The motion decoder 108 is further connected to a number of motion platforms 110 using two-way KineLink connections 112.

In D-Cinema, the audio is transported over 4 or 8 AES3 links 104 (8 or 16 channels), usually as linear PCM audio. This specification describes a way to encode the multi-channel vibro-kinetic signal composing the Motion Code™ so that it can be transported over one of the AES3 channels of a D-Cinema player.

Transporting the vibro-kinetic signal over one channel of an AES3 link has the advantage of being inherently and precisely synchronous to the audio. It is a stable fast and reliable transport that is relatively inexpensive to implement. The bandwidth available on one of the AES3 channels is a factor 30 above the minimum required to transport the vibro-kinetic signal.

In a proposed configuration, one of the available AES3 links would play the vibro-kinetic signal as a linear PCM mono stream. The motion decoder 108 would be connected to the corresponding AES3 link of the D-Cinema player 102. The motion decoder 108 would recognize and decode the vibro-kinetic signal on one of the two channels of the AES3 link, and play it to downstream motion platforms 110 or KineLink repeaters (KineHubs) (not shown). In an embodiment, a motion platform includes four actuators.

A linear PCM signal is transported onto AES3 as two channels of audio, usually at a 48 kHz sampling rate. The KineLink-over-AES3 encoding scheme described below uses an approach similar to an IEC61937 format to encode the vibro-kinetic signal over one of the two PCM channels of an AES3 link.

In this project the IEC61937 protocol was not used to encode the vibro-kinetic signal for the following reasons: a) It uses both channels of the AES3 stream. In the proposed approach one of the two channels is free for other applications (commentary, hearing impaired . . . etc.); b) The IEC61937 protocol has no formal framework (yet) that could be used to transport a multi-channel signal such as Motion Code™; and c) The software tools available to create a file for linear PCM playback over the AES3 links are simple and their operation is straightforward.

The main disadvantages of this approach are: a) The vibro-kinetic signal appears to the system as a PCM audio stream. There is nothing to protect the system against playing this signal over the sound system; b) This implementation of the D-Cinema KineLink Transport Specification relies on the fact that the data signal presented on the AES3 link is a bit-exact version of the data stored in the D-Cinema server. Any modification, as slight as it may be, would corrupt the stream in a way that would render it unrecognizable to the motion decoder. In particular the D-Cinema player sees the vibro-kinetic signal as PCM audio. It may "take liberties" with it, such as scaling, adding effects such as filtering or equalization, or adding a watermark. Any of such modification would corrupt the vibro-kinetic signal so that it is unrecognizable to the motion decoder; and c) The vibro-kinetic signal can be present on either the left or right channel of the AES3 linear PCM stream. The motion decoder must monitor both channels and recognize the vibro-kinetic signal on either one.

To alleviate the vulnerability b) described in the preceding paragraph, it is proposed to use modulation and/or compression (or "codulation") techniques in order to make the vibro-kinetic signal within the linear PCM stream more robust to various alterations and processing effects, such as for example:

Change of sign
Change of amplitude
μ-Law/A-Law Compression/Decompression
Linear filtering effects, such as equalization, room acoustics . . . etc.
Addition of an audio watermark.

Such modulation techniques will take advantage of the very large bandwidth available for the transport of the linear PCM stream, and trade-off this bandwidth for increased robustness to the above effects.

AES3 STREAM CONFIGURATION.

The AES3 stream is configured as a linear PCM stereo stream (audio). This way one channel is used to transport the vibro-kinetic signal. The other channel is available for other purposes, such as commentary.

MAPPING OF THE VIBRO-KINETIC SIGNAL ON TO IEC60958.

The signal is transported over the basic 16-bit data area of the IEC60958 sub-frames (time slots 12 to 27). This is similar to an IEC61937 encoding, except that only one of the two sub-frames is used.

Since the bandwidth provided by the IEC60958 transport is so much larger than what is required to transport the vibro-kinetic signal, the vibro-kinetic signal is packaged in data bursts. Each data burst represents a KineLink frame or block (a group of 4 KineLink coordinates). The repetition rate of the data bursts is therefore 120 IEC60958 frames at 48 kHz, or 2.5 ms. This is equal to the KineLink sampling rate.

The data bursts are normally padded with zeros, although the motion decoder 108 is not required to read the padding area.

The motion decoder 108 connected to the AES3 link must monitor and parse both channels of the AES3 stream, recognize the presence of KineLink data bursts in one of them, and lock onto them.

CONSTRUCTION OF A KINELINK DATA BURST.

The data burst is constructed of 7 consecutive 16-bit words.

TABLE 1

KineLink data burst

| Position | Contents |
|---|---|
| 0 | Preamble A: 0xAA55 |
| 1 | Preamble B: This preamble can have one of the following values:<br>0xD87A -> Active KineLink Stream<br>0xD87B -> Standby KineLink Stream<br>0xD88A -> Active KineLink Stream with 1 g Preemphasis |
| 2 to 5 | 4 samples (coordinates) of the same KineLink block (frame). The samples are transmitted in the following order:<br>0 Front-Right<br>1 Front-Left<br>2 Rear-Right<br>3 Rear-Left |
| 6 | Checksum |

Preambles. The combination of preamble A and preamble B allows the decoder to recognize the beginning of the KineLink data burst with very little ambiguity. In addition the preamble B is used to indicate if the KineLink stream is active or in standby, and when it is active if the multi-channel vibro-kinetic signal has been encoded with 1 g preemphasis or not.

Preemphasis. The 1 g preemphasis is such that the vibro-kinetic signal represents an acceleration rather than a position in the frequency range 6 Hz to 100 Hz.

This is done for two reasons: 1—The full 16-bit dynamic range of the vibro-kinetic signal can be used on the whole frequency range with no risk of saturating the actuators in acceleration. 2—The impression of "force" of the vibration signal is much more closely related to acceleration than to position. Therefore acceleration signals of equal amplitude are perceived with the same force irrespective of their frequency. The perceived force of position signals on the other hand increases with increasing frequency.

When the vibro-kinetic signal is encoded with the 1 g preemphasis, either the motion decoder or the actuators themselves must apply a de-emphasis filter.

Checksum. The checksum is calculated by: a) Adding together the 6 words appearing before the checksum, with 16-bit wrap-around arithmetic; and b) Taking the two's complement of the result. This way the addition of the checksum and the 6 previous words with wrap-around arithmetic should give zero. Since the size of the KineLink burst is fixed, many vulnerabilities of this checksum do not apply. This checksum is very easy to implement and still offers a good protection against many typical transmission errors.

The processing sequence of the KineLink file (KLK file) is as follows:

a) The KLK file is opened and each successive KineLink block is extracted;

b) The KineLink data burst is constructed by adding preambles A and B, the four vibro-kinetic samples, and the checksum. The Standby preamble is never used in the construction of the KineLink file, this would have no purpose. The Standby preamble is normally used dynamically by the movie player upstream of the motion decoder.

c) The data burst is padded with 113 zeros;

d) The succession of data bursts composes the data stream. This data stream is built into a 48 kHz mono broadcast-wave file. This is the file transferred to the processing labs for inclusion into the mxf audio file, part of the movie file bundle.

This sequence of operations is performed by a software application which converts the KLK file, comprising the vibro-kinetic signal, into a BWF file (i.e., a broadcast wave file).

Figure 2:
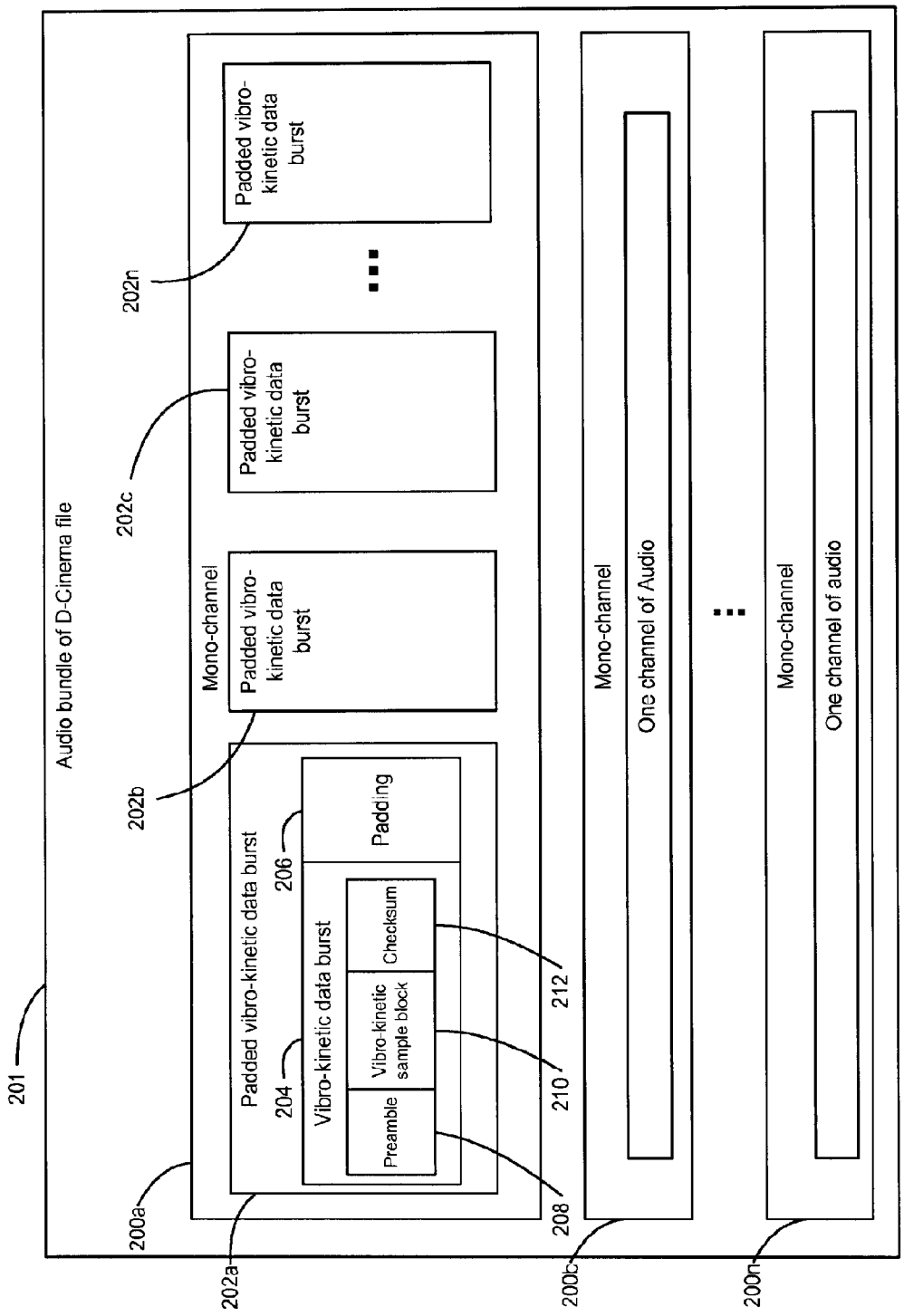
FIG. 2 is a schematic representation of an audio bundle of a digital cinema file built according to an embodiment of the invention.

Now referring to FIG. 2, there is shown a schematic representation of the audio bundle of a digital cinema file used in an embodiment of the invention and produced according to the method of FIG. 3 further discussed below. The audio bundle 201 of the D-Cinema file comprises a set of monophonic signals (200a, 200b, 200n). One of the monophonic signals (200a) transports a sequence of KineLink data bursts 204 with padding 206 (i.e., padded KineLink databurst 202a, 202b, 202c, 202n). The KineLink data burst 204 includes a preamble 208, a KineLink sample block 210 and a checksum 212.

Figure 3:
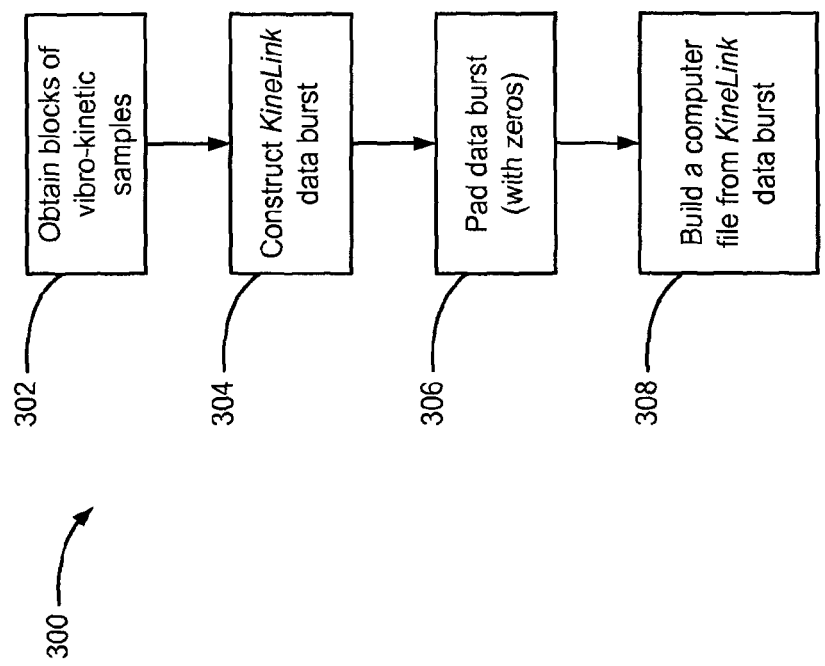
FIG. 3 is a flow chart of the method for producing a computer file for inclusion in an audio bundle of a digital cinema file according to an embodiment of the invention.

Now referring to FIG. 3, there is shown a method 300 for producing a computer file for inclusion in an audio bundle of a digital cinema file in which are encoded vibro-kinetic signals for controlling a motion platform. The method comprising obtaining a succession of blocks of vibro-kinetic samples from a KineLink file (or vibro-kinetic file or KLK file) (step 302). The method also comprising constructing a KineLink data burst (step 304). The method further comprises padding the KineLink data burst (step 306); and building a computer file from the sequence of KineLink data bursts (step 308). The computer file being for incorporation into the audio bundle of the digital-cinema file. According to an embodiment, the computer file is then stored on a memory medium which is appropriate for being read by the D-Cinema player. The memory medium, or storage device, is meant to include, but is not limited to, digital video disks, magnetic tapes or other magnetic memory medium, any types of semi-conductor memory, etc. The memory medium can be local to the D-Cinema player or external. The signal may also be received from an external network such as the Internet.

Figure 4:
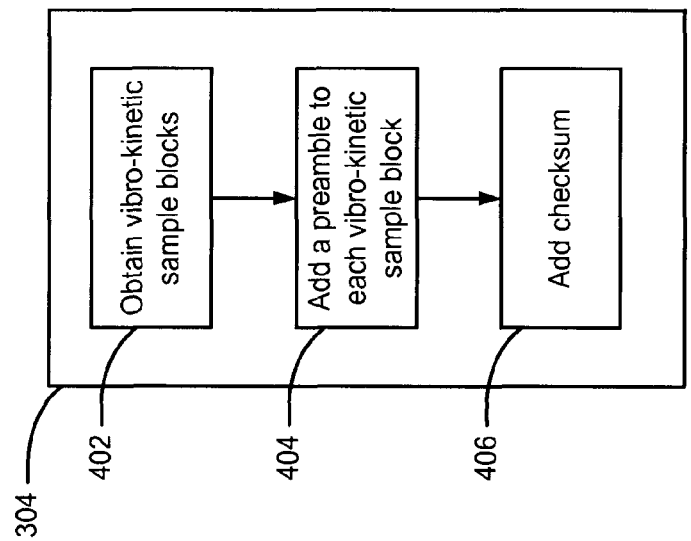
FIG. 4 is a flow chart of the method for the construction of a KineLink data burst disclosed in FIG. 3.

Now referring to FIG. 4, there is shown the step of constructing a KineLink data burst (step 304) in more detail. The constructing comprises: obtaining the blocks of vibro-kinetic samples (step 402); adding a preamble to each block of vibro-kinetic samples (step 404), the preamble for allowing the recognition of the beginning of the KineLink data burst, and indicating the mode of operation; and adding a checksum to each block of vibro-kinetic samples (step 406).

Figure 5:
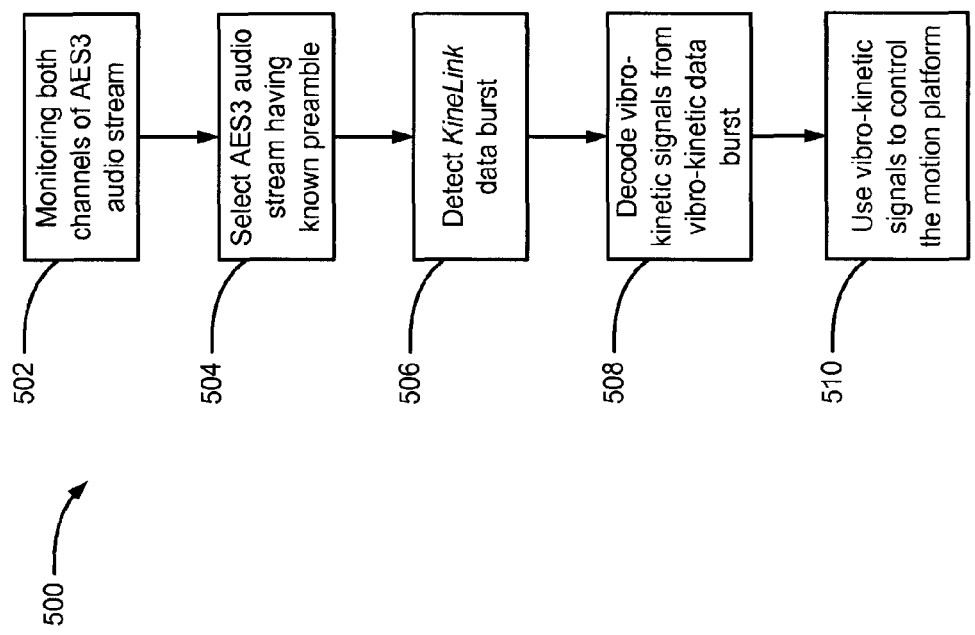
FIG. 5 is a flow chart of a method for decoding, in real time, the multi-channel vibro-kinetic signal included in a digital cinema audio stream according to an embodiment of the invention.

Now referring to FIG. 5, there is shown a method 500 for decoding, in real time, the multi-channel vibro-kinetic signal encoded in a digital cinema audio stream (AES3), each digital cinema audio stream comprising two (PCM) channels. The multi-channel vibro-kinetic signal being for controlling a motion platform. The method comprising: monitoring both channels of the AES3 audio stream (step 502); selecting the channel from AES3 audio stream which comprises a known preamble (step 504); detecting a KineLink data burst on the selected channel (step 506); decoding the vibro-kinetic signals from the KineLink data bursts (step 508); and using the vibro-kinetic signals to control the motion platform (step 510).

Figure 6:
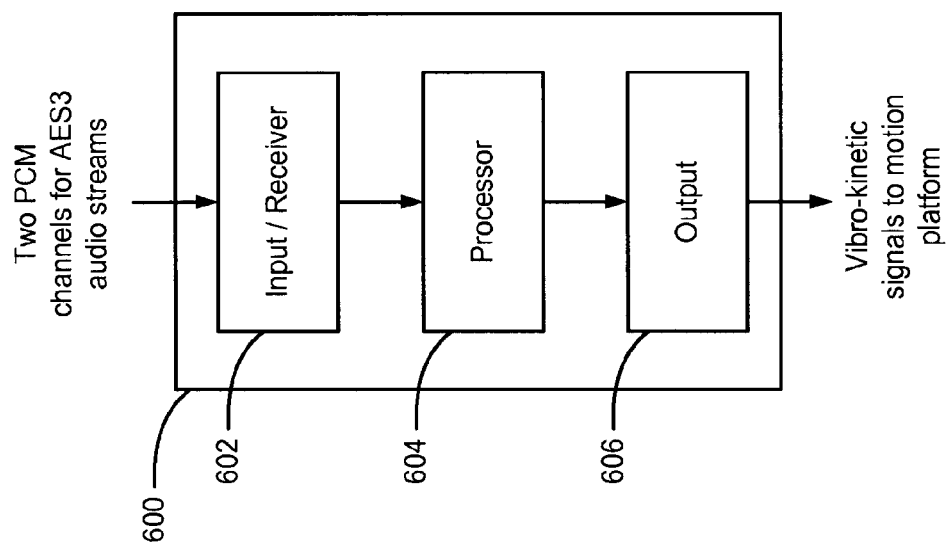
FIG. 6 is a block diagram of a motion decoder for decoding in real time the multi-channel vibro-kinetic signal included in a digital cinema audio stream according to an embodiment of the invention.

Now referring to FIG. 6, there is shown a block diagram of a motion decoder 600 for decoding in real time the multi-channel vibro-kinetic signal included in a digital cinema audio stream (AES3). Each digital cinema audio stream comprising two (PCM) channels. The multi-channel vibro-kinetic signal for controlling a motion platform. The motion decoder comprising: a receiver 602 for receiving and monitoring the AES3 audio stream; a processor 604 for selecting the channel from AES3 audio stream which comprises a known preamble; for detecting a KineLink data burst on the selected channel; and for decoding the vibro-kinetic samples from the KineLink data burst; and an output 606 for outputting the vibro-kinetic signals used to control the motion platform.

The invention claimed is:

1. A method for producing a computer file for inclusion in an audio bundle of a digital cinema file in which is encoded a multi-channel vibro-kinetic signal for controlling a motion platform, the audio bundle for being transported over a digital transport link between a D-Cinema player and a motion decoder, the method comprising:

obtaining a succession of blocks of vibro-kinetic samples from a vibro-kinetic file;

encoding binary data which represents the samples of the multi-channel vibro-kinetic signal into a sequence of monophonic PCM samples, according to a defined structure; and building a computer file using the encoded binary data, the computer file for incorporation into a monophonic PCM channel of the audio bundle of the digital-cinema file, for transporting the encoded binary data over the digital transport link of the D-Cinema player to a motion decoder controlling the motion platform.

2. The method of claim 1, further comprising storing the computer file on a memory medium.

3. The method of claim 1, further comprising incorporating the computer file in the audio bundle of the digital-cinema file.

4. The method of claim 3, further comprising storing the digital-cinema file on a memory medium.

5. The method of claim 1, further comprising at least one of modulating and compressing the encoded binary data to be transmitted as a PCM signal over the digital transport link in order to make its transport within the linear PCM stream more robust to various alterations and processing effects including at least one of: change of sign;
change of amplitude; A-law/μ-law Compression/Decompression; linear filtering effects, such as equalization, room acoustics; and addition of an audio watermark.

6. The method of claim 1, further comprising adding a preamble to each block of vibro-kinetic samples.

7. The method of claim 6, further comprising adding a checksum to each block of vibro-kinetic samples to which the preamble was added.

8. The method of claim 7, further comprising padding with zeros the vibro-kinetic samples to which a preamble and a checksum were added.

9. The method of claim 1, wherein the building a computer file comprises building a computer file in the AES3 format.

10. A motion encoder for producing a computer file for inclusion in an audio bundle of a digital cinema file, the motion encoder comprising:
    an input for receiving a succession of blocks of vibro-kinetic samples from a vibro-kinetic file;
    a processor for encoding binary data which represents the samples of the multi-channel vibro-kinetic signal into a sequence of monophonic PCM samples, according to a defined structure; said processor being adapted to build a computer file using the encoded binary data, the computer file for incorporation into the audio bundle of the digital-cinema file for transporting the encoded binary data over the digital transport link of the D-Cinema player to a motion decoder controlling the motion platform; and
    an output for forwarding the computer file to a memory device.

11. A method for decoding, in real time, a multi-channel vibro-kinetic signal included in a digital cinema audio stream, the digital cinema audio stream comprising a monophonic PCM channel, the vibro-kinetic signal comprising blocks of vibro-kinetic samples and being for controlling a motion platform, the method comprising:
    monitoring the monophonic PCM channel of the digital cinema audio stream;
    decoding the vibro-kinetic signal from the digital cinema audio stream; and
    using the vibro-kinetic signal to control the motion platform.

12. The method of claim 11, wherein the decoding comprises detecting a preamble to each block of vibro-kinetic samples.

13. The method of claim 12, further comprising performing a checksum operation on each block of vibro-kinetic samples.

14. The method of claim 11, wherein the digital audio stream comprises the AES3 format and comprises two PCM channels.

15. The method of claim 14, wherein the monitoring comprises monitoring both channels of the digital audio stream.

16. A motion decoder for decoding, in real time, a multi-channel vibro-kinetic signal included in a digital cinema audio stream (AES3), the digital cinema audio stream comprising a monophonic PCM channel, the vibro-kinetic signal comprising blocks of vibro-kinetic samples and being for controlling a motion platform, the motion decoder comprising:
    a receiver for receiving and monitoring the monophonic PCM channel of the digital cinema audio stream;
    a processor for decoding the vibro-kinetic signal from the encoded digital audio stream; and
    an output for outputting the vibro-kinetic signal used to control the motion platform.

17. The motion decoder of claim 16, wherein the decoding comprises detecting a preamble to each block of vibro-kinetic samples.

18. The motion decoder of claim 17, wherein the processor is further for performing a checksum operation on each block of vibro-kinetic samples.

19. The motion decoder of claim 16, wherein the digital audio stream comprises the AES3 format and comprises two PCM channels.

20. The motion decoder of claim 19, wherein the monitoring comprises monitoring both channels of the digital audio stream.

* * * * *